United States Patent [19]

Svatek

[11] Patent Number: 4,494,148
[45] Date of Patent: Jan. 15, 1985

[54] COMPACT VIDEO SLIDE PROJECTOR
[75] Inventor: Thomas A. Svatek, Carlisle, Mass.
[73] Assignee: Polaroid Corporation, Cambridge, Mass.
[21] Appl. No.: 430,524
[22] Filed: Sep. 30, 1982
[51] Int. Cl.³ .............................................. H01J 29/89
[52] U.S. Cl. .................................. 358/226; 358/216; 358/209
[58] Field of Search ............... 358/209, 214, 225, 226, 358/227, 185, 216, 97, 162, 229

[56] References Cited

U.S. PATENT DOCUMENTS

| | | | |
|---|---|---|---|
| 2,976,357 | 3/1961 | Hammett | 358/185 |
| 3,814,853 | 6/1974 | Lardeau | 358/226 |
| 3,956,579 | 3/1976 | Doumit | 358/185 |
| 3,997,723 | 12/1976 | Sandin | 358/226 |

OTHER PUBLICATIONS

Telemation, Inc., Mar. 1971, #TPB-170-1, Broadcast Optical Multiplexer Model TMM-211.

Primary Examiner—Gene Z. Rubinson
Assistant Examiner—Robert G. Lev
Attorney, Agent, or Firm—John S. Vale

[57] ABSTRACT

A compact video slide projector provides video image signals representing a recorded image on a 35 mm slide for display on a TV set or video monitor. Compactness is achieved by arranging an elongated video camera at right angles to the slide projection path of a slide projector/changer mechanism and directing image light from the projection path along a perpendicularly disposed camera input axis.

2 Claims, 2 Drawing Figures

COMPACT VIDEO SLIDE PROJECTOR

BACKGROUND OF THE INVENTION

The present invention relates to the field of photographic image projection and, more specifically, to a video signal output slide projector for converting an optical image recorded on a 35 mm slide transparency into video image signal form.

In industrial audio/visual systems and consumer-oriented "electronic home entertainment centers", the standard color television broadcast receiver or a color video monitor is fast becoming the preferred medium for displaying all types of text and pictorial information. In addition to displaying regular TV programs, TV sets are used to portray video information provided from cable TV systems, video tape recorders, video disc players, low-cost home TV cameras, home video games, and personal or small business computers.

In the photographic field, there have been some indications over the past few years that consumers, as well as audio/visual professionals, are turning away from slide transparencies in favor of reflection prints or some other formats, e.g. video tape, to present photographically recorded images. Some of the reasons proposed to explain this trend suggest that it is too bothersome to set up a projection screen and projector for slides, and the requirement for the room to be almost completely dark for good slide viewing inhibits ancillary tasks such as note taking at business conferences or other meetings.

Because the 35 mm slide does provide a very convenient and relatively low-cost way to record high-quality photographic images, it is highly desirable to integrate this medium into video display systems.

One type of device known in the prior art for facilitating the conversion of optical images on slides to video image signal form is a film/video multiplexer unit which serves as an optical coupling interface between the projection lens of a conventional slide projector and the objective lens of a video camera. Such multiplexer units tend to be awkward to use and rather larger because major portions of their structures are dedicated to supporting the projector and video camera in precise alignment with the multiplexer optics.

Also known in the prior art are professional film/video converters that combine a slide projector and video camera in an integrated package. These devices are generally used at TV stations or at audio/visual service companies that specialize in recording slides, photographic prints, movies, and graphic art on a video tape. However, these converters tend to be quite large and expensive because they must be constructed in a rugged fashion to withstand the rigors of almost constant use.

None of the film/video multiplexers or converters on the market today serve the needs of the small audio/visual department or readily fit into the "electronic home entertainment center" concept because they are excessively expensive and/or large, and in some instances so complex to use as to require a technically trained operator.

Therefore, it an object of the present invention to provide a compact, low-cost and easy-to-use video slide projector.

It is also another object to provide such a video slide projector which utilizes major portions of conventional, off-the-shelf, slide projector and a home video camera, and combines them in a unique packaging scheme to provide a very compact configuration.

Yet another object of the invention is to provide such a video slide projector with a simple mechanism for moving the camera relative to a slide holder for focusing purposes.

Other objects of the invention will, in part, be obvious and will, in part, appear hereinafter.

SUMMARY OF THE INVENTION

The present invention provides a compact, low-cost and easy-to-use video slide projector for providing video image signals that represent an image recorded on a slide transparency.

Major components of the projector include a housing having a generally rectangular base, a slide holder, a light source, a video camera, and means for directing image light eminating from the illuminated slide transparency to the video camera.

The slide holder is mounted to locate the holder in an optical image projection path extending in a first direction within the housing. A light source located behind the holder illuminates a slide therein to project an optical image of the recorded image on the slide along the projection path.

The video camera is an elongated structure, including an optical image input section at one end thereof, for receiving optical image light provided along an input axis that is substantially parallel to the long dimension of the camera and is directed to the input section, and for converting the received image light into representative video image signals that are available at a camera output.

The camera is mounted in the housing with its long dimension extending in a second direction substantially perpendicular to the first direction and with the one end of the camera closest to the slide projection path so that the input axis and the slide projection path are substantially mutually perpendicular.

Means are provided between the holder and the one end of the camera for directing image light from the projection path along the input axis so that an optical image of the recorded image on the slide in the holder is provided to the camera input section.

The video slide projector preferably also includes a slide changing mechanism for selectively moving slides into and out of the holder. Overall dimensions of the video slide projector are minimized to achieve compactness by locating the slide changing mechanism in an included angle space bounded along two sides by the camera and the projection path having the holder therein.

In the illustrated embodiment, the elongated video camera is pivotly mounted to adjust the distance between the holder and a lens mounted on the camera for focusing purposes.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
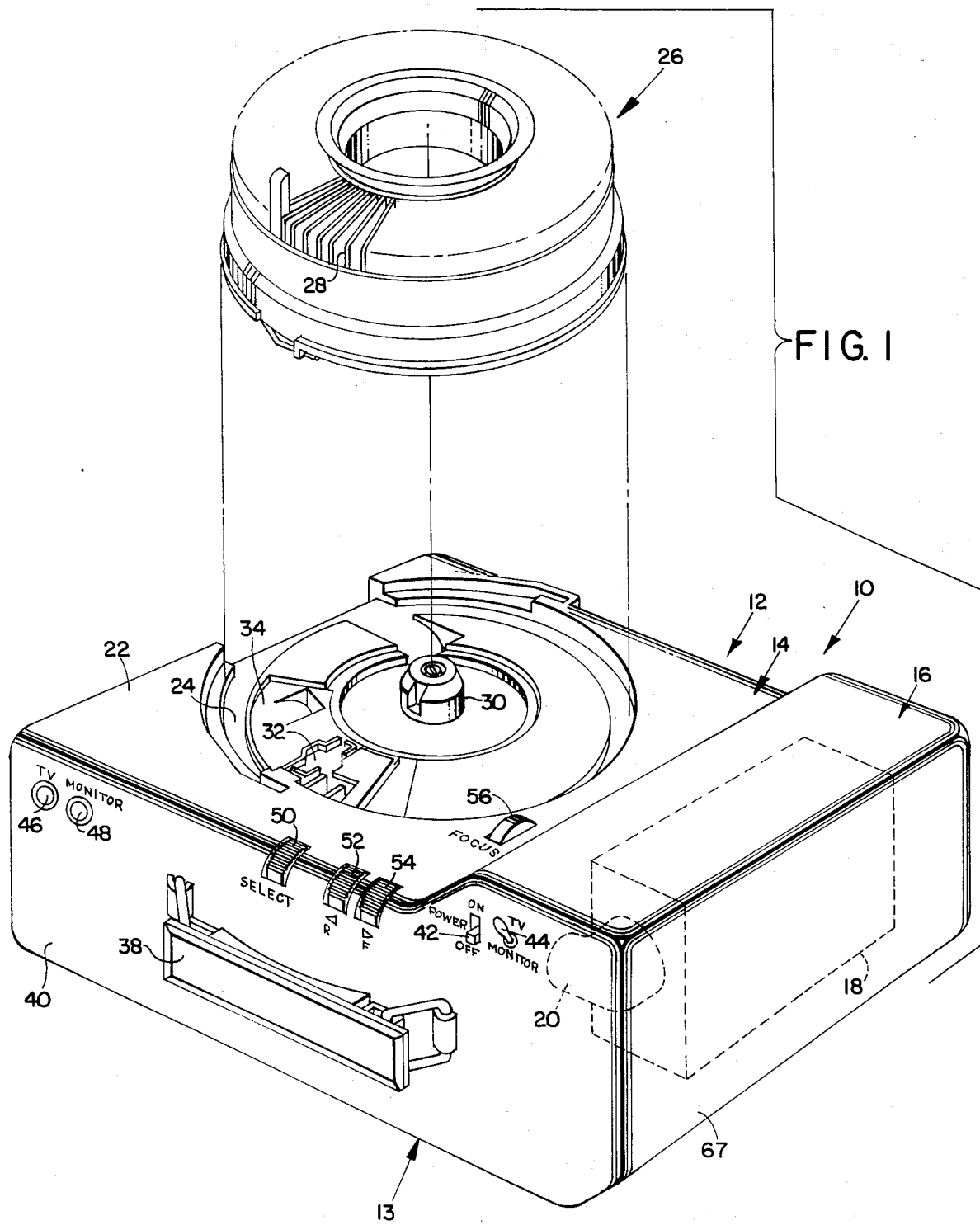
FIG. 1 is a perspective view of the video slide projector embodying the present invention and a slide storage reel for use therewith.
Figure 2:
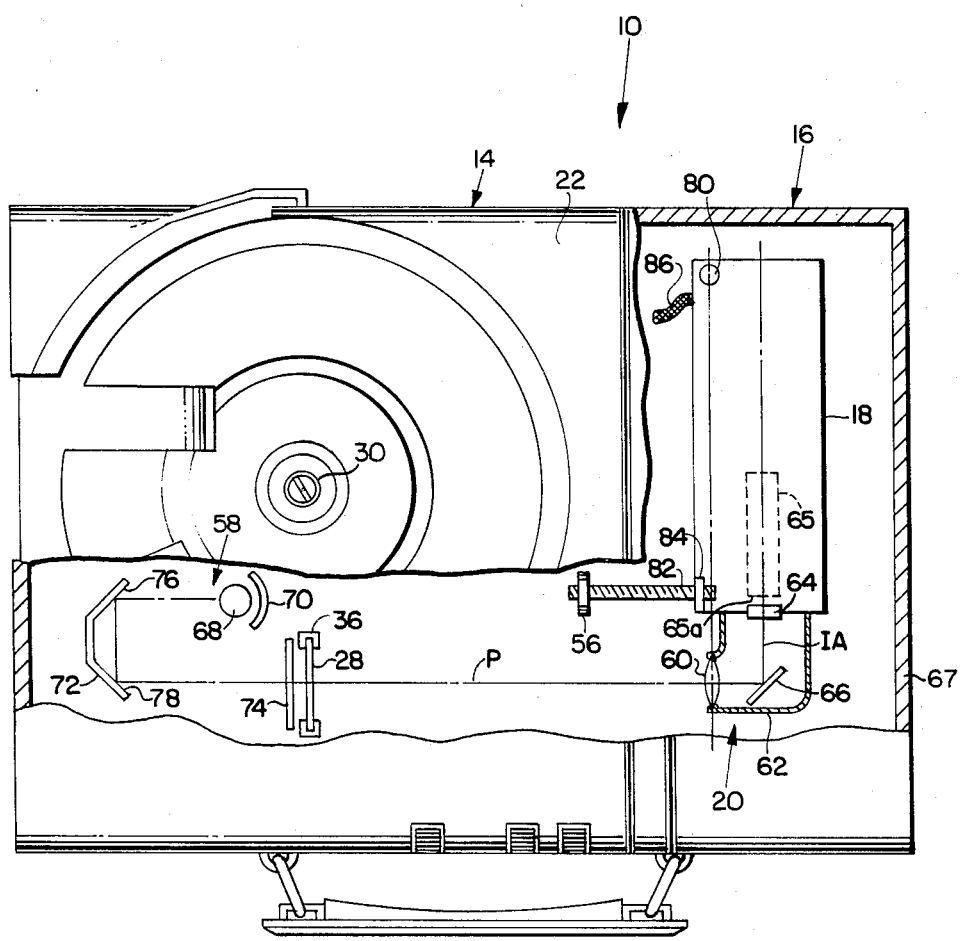
FIG. 2 is a top view of the video slide projector shown in FIG. 1 that has been partially cut away to show selected interior components.

A compact video slide projector 10 embodying the present invention is shown in FIGS. 1 and 2. Projector 10 integrates elements of an automatic 35 mm slide projector/changer and a small color video or TV camera into a single compact apparatus for providing a color video output signal representative of a photographically recorded image on a 35 mm slide transparency for display on a standard color television receiver or a color video monitor.

As best shown in FIG. 1, projector 10 includes a generally box-like housing 12 preferably of molded plastic construction, having a substantially rectangular base or bottom wall 13. Housing 12 includes a first major housing section 14 mounting and/or enclosing a modified automatic gravity feed type slide projector/-changer mechanism; and a narrower, but somewhat taller, elongated second housing section 16, contiguous with and disposed along one side of housing section 14, enclosing a compact elongated color video camera 18 and an optical assembly 20 (both shown diagrammatically in dotted phantom lines).

The top wall 22 of housing section 14 has a generally circular recess 24 therein for receiving a conventional circular carousel-type slide storage reel 26 having a plurality of mounted 35 mm slide transparencies 28 stored in individual vertical channel compartments arranged about reel 26. When reel 26 is seated in recess 24, its inner hub is engaged by a rotatable reel drive shaft 30 which is turned, by a drive motor system in housing section 14 below recess 24 (not shown), in steps to sequentially present each of the channel compartments over a slide access slot 32 in the bottom wall section 34 of recess 24.

Slot 32 communicates with the interior of housing section 14 and is in alignment with a vertically disposed channel-like slide holder 36 (see FIG. 2) located at a projection station in the projector's image projecting path P. In response to indexing reel 26 one step, a channel compartment is presented over slot 32 and the slide 28 therein drops by gravity feed into holder 36 to locate it in position for projection. Following projection, the reel drive system is actuated and a slide changing mechanism in housing section 14 (not shown) lifts the slide out of holder 36 and moves it upwardly back into its channel compartment. Then the reel 26 is automatically indexed one step to feed the next slide 28 into holder 36.

Such reel drive and gravity feed slide changing mechanisms are well-known in the art and any one of a variety of commercially available units may be incorporated into projector 10 with minor modifications. In the illustrated embodiment, the reel drive and changing mechanism forms part of a commercially available automatic slide projector/changer marketed by the Singer Company, Education Division, under the model designations CARAMATE 3100–3200. The reel drive and slide changing mechanism will not be described in further detail herein because such mechanisms are well-known in the art and an expanded description is not necessary for a clear understanding of the present invention.

Other elements of projector 10 shown in FIG. 1 include a carrying handle 38 mounted on a forward wall 40 of housing 12, along with a power on/off slider switch 42; a TV/monitor selector toggle switch 44; a "TV" (signal modulated for reception by a conventional TV broadcast receiver) output jack 46; and a video "monitor" signal output jack 48. Controls for the slide changing mechanism include three manually actuable push buttons projecting through corresponding openings in housing 12 at the junction of walls 22 and 40. These include a "select" button 50 which is operative to effect disengagement of the reel 26 from the drive shaft 30 so that the reel 26 may be turned manually to a designated initial position for removing reel 26 from recess 24 or loading new reel thereinto; a "forward" index button 52 and a "reverse" index button 54 which are actuable to effect one step indexing of reel 26 in either the forward or reverse directions. Projector 10 also includes a focus adjusting wheel 56 which projects through an opening in housing top wall 22 and, as will be described later, it is used to focus camera 18 on a slide 28 in holder 36.

As best shown in FIG. 2, a source of diffused light 58 behind holder 36 is provided to uniformly illuminate a slide 28 therein and project an optical image of the image recorded on the slide along projection path P that extends in a first direction which is substantially parallel to the elongated front wall 40 of housing 12.

In a conventional slide projector/changer, a projection lens is mounted in path P for projecting an image of the illuminated slide onto a remote screen. In the video slide projector 10 embodying the present invention, the slide projection structure is modified by removing the standard projection lens and locating the optical device 20, mounted on camera 18 in housing section 16, so that its input or objective lens 60 is in projection path P to receive an optical image of the slide 28 in holder 36.

Lens 60 is mounted on the left-hand or input end of a hollow L-shaped tube 62 which has its output end mounted on the forward end of the camera casing around a vidicon tube input opening or window 64 through which image light is transmitted to the front surface 65a of the camera's vidicon tube 65 aligned with opening 64 on the camera's input axis IA. The opening 64 and the front surface 65a of vidicon tube 65 define the camera's optical image input section at the forward end of camera 18.

Mounted within tube 62, between lens 60 and window or opening 64, is a 45° mirror 66 which reflects image light from lens 60 incident thereupon along the input axis IA which is perpendicular to the input window or opening 64 and the vidicon surface 65a and is substantially parallel to the long dimension of video camera 18. Thus, mirror 66 establishes a folded optical path within the optical device 20 whereby image light is reflected through 90° from path P to input axis IA of camera 18. By bending the optical path in this manner, the elongated camera 18 can be mounted parallel to side wall 67 of housing section 16 in a compact configuration snugly alongside housing section 14 whereby the camera input axis IA and the long dimension of camera 18 extend in a second direction and are transversely or perpendicularly disposed with respect to the projection path P. It will be understood that optical device 20 serves as means between the holder 36 and the input section of camera 18 for directing image light from the projection path P along the input axis IA of the camera 18 so that an optical image of a slide in the holder is provided to the camera's vidicon tube.

Because conventional slide projector/changers are designed to project an image of a slide onto a remote viewing screen, they are generally equipped with a high energy output light source (e.g. a 100 to 500 watt projection lamp in a reflector which directs the lamp output through a diffuser to the back side of the slide holder). Even though these lamps have been improved in terms of efficiency during the past few years, they still generate a great deal of heat which must be dissipated so as not to overheat, distort or otherwise damage the slide in the holder. Generally, such projectors are equipped with a motor-driven fan which directs a stream of cooling air over the lamp and out of the housing through louvered vents. While these cooling fans are quite effective, they tend to be somewhat noisy and the motor that drives the fan (and generates its own noise) must be run continuously when the projector is in operation.

Because projector 10 is used in combination with a sensitive video camera which can detect a much lower brightness image than is required for projection onto a remote screen, the conventional high energy light source can be eliminated and replaced with a low energy output light source. Advantageously, very little heat is generated by the low energy output light source obviating the need for forced air cooling. This means the fan can be eliminated and the motor no longer has to run continuously to operate such a fan thereby providing much quieter operation of projector 10 in that the motor is off during slide projection and only operates intermittently in response to pushing buttons 52 or 54 to operate the reel drive and slide changing mechanism.

In the preferred embodiment, the slide projector/changer has been modified by replacing the high energy output light source and its associated cooling fan with the low energy output light source 58. Light source 58 comprises a low energy output (12 watt) incandescent lamp 68 off to one side of the projector path P behind holder 36; a rearwardly facing reflector 70 in front of lamp 68; and a corner type reflector 72 including 45° reflecting surfaces 76 and 78 for bending the light from lamp 68 through 180° and directing it along the projection path P passing through holder 36. In the illustrated embodiment, the light source 58 further includes an opal glass or translucent plastic diffuser plate 74 just behind holder 36 for diffusing the light from lap 68 to more uniformly illuminate a slide 28 in holder 36. In an alternative embodiment, the angled reflecting surfaces 76 and 78 of corner reflector 72 may also serve as diffusing surfaces (e.g. matte white surfaces) thereby eliminating the need for a separate diffuser 74.

In the illustrated embodiment, the lens 60 is a 40 mm, f5.6 lens which is preset during manufacture in tube 62 at a fixed distance (via reflection by mirror 66) from the front input face or surface 65a of vidicon tube 65. Then, camera 18 is mounted in housing section 16 with the input axis IA transverse to the projection path P, at a location that sets the correct distance between lens 60 and the holder 36 whereby lens 60 provides a sharply focused image of a slide 28 in holder 36 at the input surface 65a of the vidicon tube 65. However, because of normal manufacturing variances in 35 mm slide mounts, and variations in slide mounting techniques that may result in a slight inward or outward bowing of the mounted transparency, not every slide inserted into holder 36 will be in perfect focus. Therefore, it is desirable to provide some means for varying the distance between lens 60 and holder 36 to effect a focusing adjustment.

One way to do this is to mount camera 18 so that the whole camera may be shifted or moved laterally in a direction parallel to projection path P to vary the lens to holder distance. To do so, however, would require a rather complex camera mounting arrangement that would only increase the size, weight and cost of the projector.

In more instances it is only necessary to make very small changes in the lens to holder distance to achieve a sharply focused image at the vidicon input surface 65a. Because these focus adjustment changes are so small, it has been found that they can be made simply by mounting camera 18 so it pivots in a horizontal plane about a vertical pivot pin support 80 at the rear of housing section 16 which is coupled to the left rear end of the camera casing or its internal support frame. By pivoting camera 18 in a clockwise direction about pin 80, lens 60 is moved closer to holder 36. Conversely, lens 60 is moved further away from holder 36 by pivoting camera 18 in a counterclockwise direction about pin 80.

Obviously, when the camera is pivoted away from its nominal position, wherein the input axis IA of the camera is exactly perpendicular to the projection path P, the lens 60 moves along an arcuate rather than a linear path which would seem to cause image distortion because of a misalignment of the optical elements. However, it has been found that if the radial distance between the pivot and lens is made large enough (i.e. by locating the pivot 80 at the rear of the camera 18 to maximize the lens to pivot radius) and the pivot is placed on a radial line which passes through the lens at its nominal position so that the center of lens 60 (coincident with the lens optical axis) is positioned tangentially with respect to the projection path P, then for the small camera displacement needed to adjust focus, the lens follows such a shallow curvature path that its movements, for all practical purposes, may be considered to be essentially linear with respect to path P and any optical distortions that may occur are so trivial as not to be noticeable.

Any suitable means may be provided for pivoting camera 18 to effect focusing. For example, in the illustrated embodiment the focus wheel 56 is attached to one end of a lead screw 82 having its opposite end threaded into a receiving nut assembly 84 that is pivotly mounted on the forward end of the camera casing. Thus in response to rotation of lead screw 82, by turning wheel 56, assembly 84 travels therealong to effect pivoting camera 18 about pivot pin 80.

One example of a color video camera suitable for use in projector 10 is the Hatachi model VK-C770. Its video signal output is provided through an output cable 86 which is connected to a switching network (not shown) controlled by toggle switch 44. When switch 44 is in the "TV" position, the video signal output from cable 86 is fed to a conventional channel 3/channel 4 RF converter in housing section 14 (not shown) wherein the video signal output is applied to a broadcast frequency carrier. The modulated output from the RF converter is then fed to the TV output jack 46. When switch 44 is in the "monitor" position, the converter is bypassed and the video output signal from cable 86 is fed directly to the monitor jack 48.

In use, projector 10 is operated in the following manner. If the video image is to be displayed on a standard TV receiver, a cable attached to the TV antenna terminals is coupled to the "TV" video signal output jack 46 and toggle switch 44 is set in the "TV" position. For use with a video monitor, switch 44 is set in the "monitor" position and the monitor video input cable is plugged into monitor jack 48.

A reel 26 holding a plurality of slides 28 is seated in recess 24 with its inner hub in engagement with the drive shaft 30. The TV or monitor is turned on and the slide projector 10 is activated by moving power switch 42 to the "on" position. When projector power is turned on, the projection lamp 68 and video camera 18 are energized. If switch 44 is in the "TV" position, the RF converter is also energized. Also, the reel drive and slide changing mechanism is enabled in that power will be supplied to its motor through a cycle control circuit in response to the operator actuating either the forward or reverse indexing switches 52 and 54.

A video slide projection cycle is initiated by actuating switch 54 to index reel 26 forwardly one step thereby feeding the first slide 28 into holder 36. Light source 58 illuminates the slide causing an optical image of its photographically recorded information to be transmitted along projection path P to lens 60. Lens 60 forms a focused image of the slide at the input face or surface 65a of the vidicon tube 65 via reflection by mirror 66. In response to this optical image input, video camera 18 provides corresponding color video image signals at its output cable 86. This video signal output is fed to the selected output jack (46 or 48) and then to the video display device connected thereto to display a video image of the slide in holder 36. If the display image is out of focus, focus wheel 56 is used to pivot the camera 18 to make the appropriate focusing adjustment.

The slides are displayed in sequence by repeatedly actuating the reel drive and slide changing mechanism 30 indexing switch 54 or 52. Those skilled in the art will appreciate that the video image signal output from projector 10 also may be fed to a video recorder to record and store video images of the slides on magnetic tape.

Slide projector 10 differs from other slide to video devices known in the prior art in that it is packaged in a very compact configuration that makes it convenient to use and easy to transport and store. Compactness is achieved by utilizing many of the components of a conventional slide projector/changer and arranging the elongated video camera 18 along one side of the chamber mechanism at right angles to the image projection path P having holder 36 therein. This packaging arrangement sets the input axis IA of camera 18, which is parallel to the long dimension of the camera, in a perpendicular relation to the projection path P. The optical device 20 (lens 60 in combination with the 45° mirror 66) serves as means for optically coupling the slide projection station to the video camera 18 by directing optical image light from the projection path P to the camera input section along input axis IA. Projector 10 also features a simply constructed camera focusing system wherein the camera is pivotally mounted so that the lens 60 is in a tangential relation to the projection path P thereby providing a very shallow arc path of travel for the lens to follow for focusing purposes. For all practical purposes, this shallow arc movement emulates linear movement so that image distortion is not objectionable.

Another construction feature that enhances the compactness of projector 10 is that the reel drive and slide changer mechanism, along with its power supply, control circuits, the RF converter, etc., are located in a space bounded on one side by the projection path P including part of the light source 58 and the holder 36, and on an adjacent transverse side by the elongated video camera 18. Thought of in another way, the slide projection structure and path is set at right angles to the elongated video camera 18 and the included angle space therebetween is utilized for mounting the reel drive and slide changer mechanism along with the other associated components listed above.

Since certain changes may be made in the above-described video slide projector without departing from the spirit and scope of the invention herein involved, it is intended that all matter contained in the above description or shown in the accompanying drawings shall be interpreted as illustrative and not any limiting sense.

What is claimed is:

1. A compact video slide projector for providing video image signals that represent an image recorded on a slide transparency, said projector comprising:
   a housing;
   a slide holder located in an optical image projection path extending along a first direction within said housing;
   a light source for illuminating a slide in said holder to project an optical image of the recorded image on the slide along said projection path;
   an elongated video camera, including an optical image input section at one end thereof, for receiving optical image bearing light provided along an input axis directed to said input section and being substantially parallel to the long dimension of said camera, and for converting the received image light into representative video signals that are available at a camera output;
   means for mounting said camera in said housing so its long dimension extends in a second direction substantially perpendicular to said first direction with said input section closest to said projection path so that said input axis and said projection path are substantially mutually perpendicular;
   optical means between said holder and said input section for directing image light from said projection path along said input axis so that an optical image of the recorded image on the slide in said holder is provided to said camera input section; and
   a slide changing mechanism for selectively moving slides into and out of said holder, said slide changing mechanism being located within an included angle space bounded along two sides by said elongated camera and said projection path having said holder therein.

2. The projector of claim 1 wherein said optical means is fixedly mounted on said camera and includes a lens configured to be located in said projection path to form a focused image of the recorded image on a slide in said holder, and a mirror for reflecting light from said lens along said input axis of said input section, and wherein said camera is mounted for pivotal movement about a pivot axis at the rear of said camera, opposite said one end and remote from said optical means, so that in response to pivoting said camera said lens moves along a shallow arc path for varying the spacing between said lens and holder to adjust the focus of the image provided by said lens.

* * * * *